United States Patent [19]

Takemura et al.

[11] Patent Number: 5,080,019

[45] Date of Patent: Jan. 14, 1992

[54] TRANSFERRING SYSTEM FOR TRANSFERRING DELIVERY MEMBERS TO THEIR DESTINATIONS THROUGH COMPUTED TRANSFER ROUTE

[75] Inventors: Tohru Takemura, Nagoya; Yoshihisa Nozaki, Toyokawa; Yoshihide Sugihara, Nagoya, all of Japan

[73] Assignee: Brother Kogyo Kabushiki Kaisha, Japan

[21] Appl. No.: 697,196

[22] Filed: May 8, 1991

[30] Foreign Application Priority Data

May 18, 1990 [JP] Japan ............................... 2-129698

[51] Int. Cl.⁵ .............................................. B65G 17/24
[52] U.S. Cl. ........................................ 104/88; 198/369; 198/341; 198/349.6
[58] Field of Search ................... 104/88, 48, 96, 130; 198/369, 465.1, 341, 349.6, 358, 349.5, 349.8

[56] References Cited

U.S. PATENT DOCUMENTS

| | | | |
|---|---|---|---|
| 386,872 | 7/1888 | Ellis | 104/99 |
| 582,436 | 5/1897 | Ridgway | 104/99 |
| 988,276 | 3/1911 | McLaren | 104/91 |
| 1,403,853 | 1/1922 | Ferris | 104/91 |
| 1,684,986 | 9/1928 | Gillies | 104/99 |
| 3,104,621 | 9/1963 | Withers | 104/91 |
| 3,307,720 | 3/1967 | Davis | 214/89 |
| 3,530,571 | 9/1970 | Perry | 29/563 |
| 3,592,141 | 7/1971 | Davidson | 104/88 |
| 3,747,537 | 7/1973 | Matsumoto et al. | 104/38 |
| 4,291,797 | 9/1981 | Ewertowski | 198/472 |
| 4,326,624 | 4/1982 | Ewertowski et al. | 198/370 |
| 4,552,072 | 11/1985 | Kardinal | 104/88 |
| 4,597,495 | 7/1986 | Knosby | 209/3.3 |
| 4,726,299 | 2/1988 | Anderson | 104/88 |

FOREIGN PATENT DOCUMENTS

| | | |
|---|---|---|
| 2309939 | 2/1973 | Fed. Rep. of Germany . |
| 3935598 | 5/1990 | Fed. Rep. of Germany ...... 198/358 |
| 46-40033 | 11/1971 | Japan . |
| 1409391 | 10/1975 | United Kingdom . |
| 2021500 | 12/1979 | United Kingdom . |
| 2064454 | 6/1981 | United Kingdom . |
| 2089752 | 6/1982 | United Kingdom . |
| 2121366 | 12/1983 | United Kingdom . |
| 2106465 | 9/1984 | United Kingdom . |
| 87/06551 | 11/1987 | World Int. Prop. O. . |

*Primary Examiner*—Robert J. Oberleitner
*Assistant Examiner*—Mark T. Le
*Attorney, Agent, or Firm*—Kane, Dalsimer, Sullivan, Kurucz, Levy, Eisele and Richard

[57] ABSTRACT

Transferring system for transferring delivery members to their destinations through a computed transfer route when any trouble exists in a usual transfer route. The delivery members carrying a workpiece to be stitched, and is to be transferred to a desired work station (destination). The delivery member undergoes distribution by a plurality of distribution mechanisms and transferring rails connecting the distribution mechanisms. By suitable control to the distribution mechanism the delivery member reaches its destination even if any troubled location exists in a transfer route. The transferring system includes the distribution mechanism, line connecting information storage device, transfer control device, trouble storage device and new route setting mechanism. The trouble judgment device is connected to the line connecting information storage device. The transfer control device is connected to the line connecting information storage device and the new route setting mechanism. The new route setting mechanism is connected to the line connecting information storage device, the trouble judgment device and the trouble storage device.

7 Claims, 14 Drawing Sheets

| DELIVERY MEMBER NUMBER | 36-1 | 36-2 | 36-3 | 36-4 | ... |
|---|---|---|---|---|---|
| DESTINATION COMMAND (STATION NUMBER) | ST7 | ST3 | ST5 | ST13 | ... |

76

80

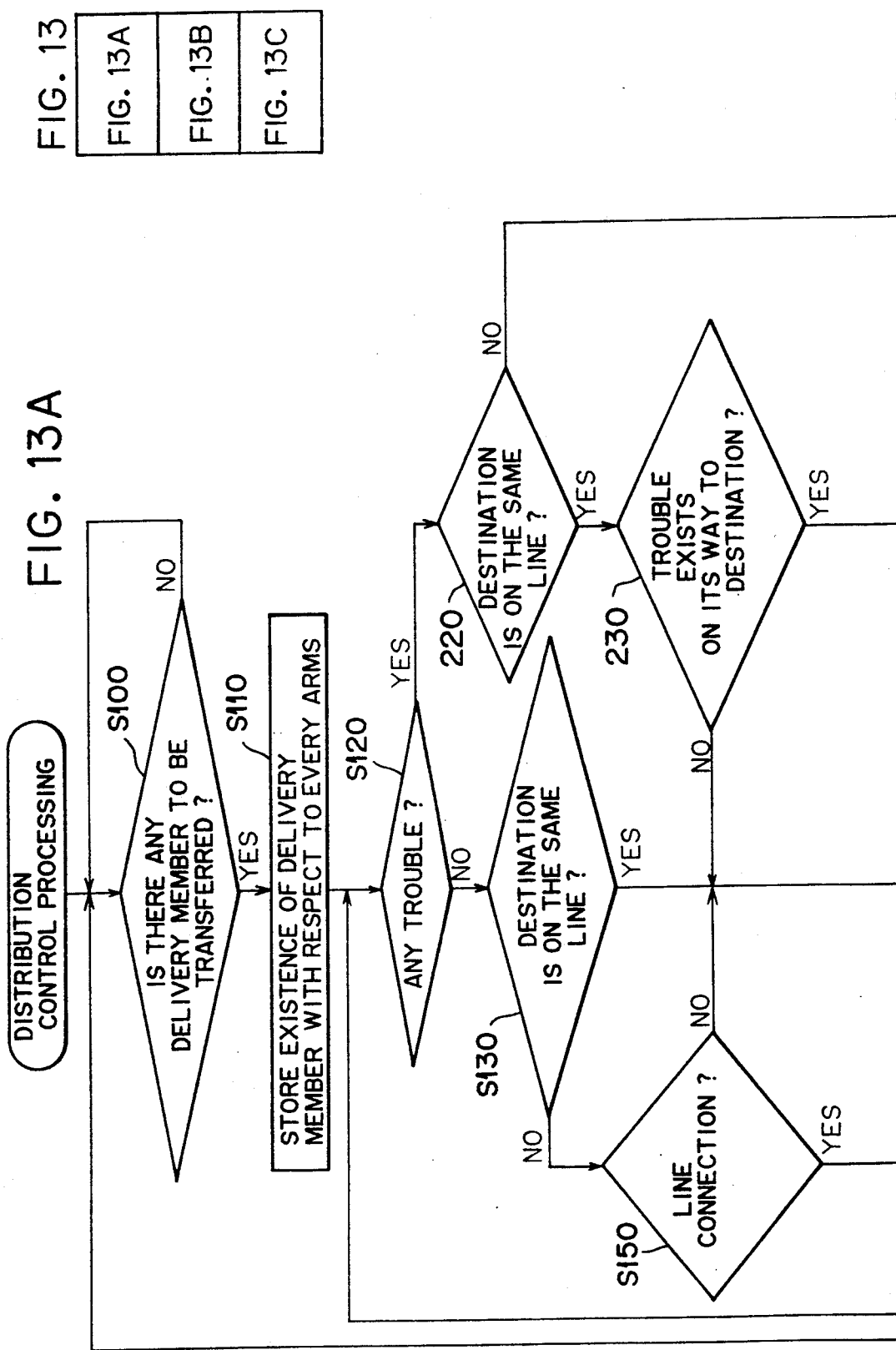

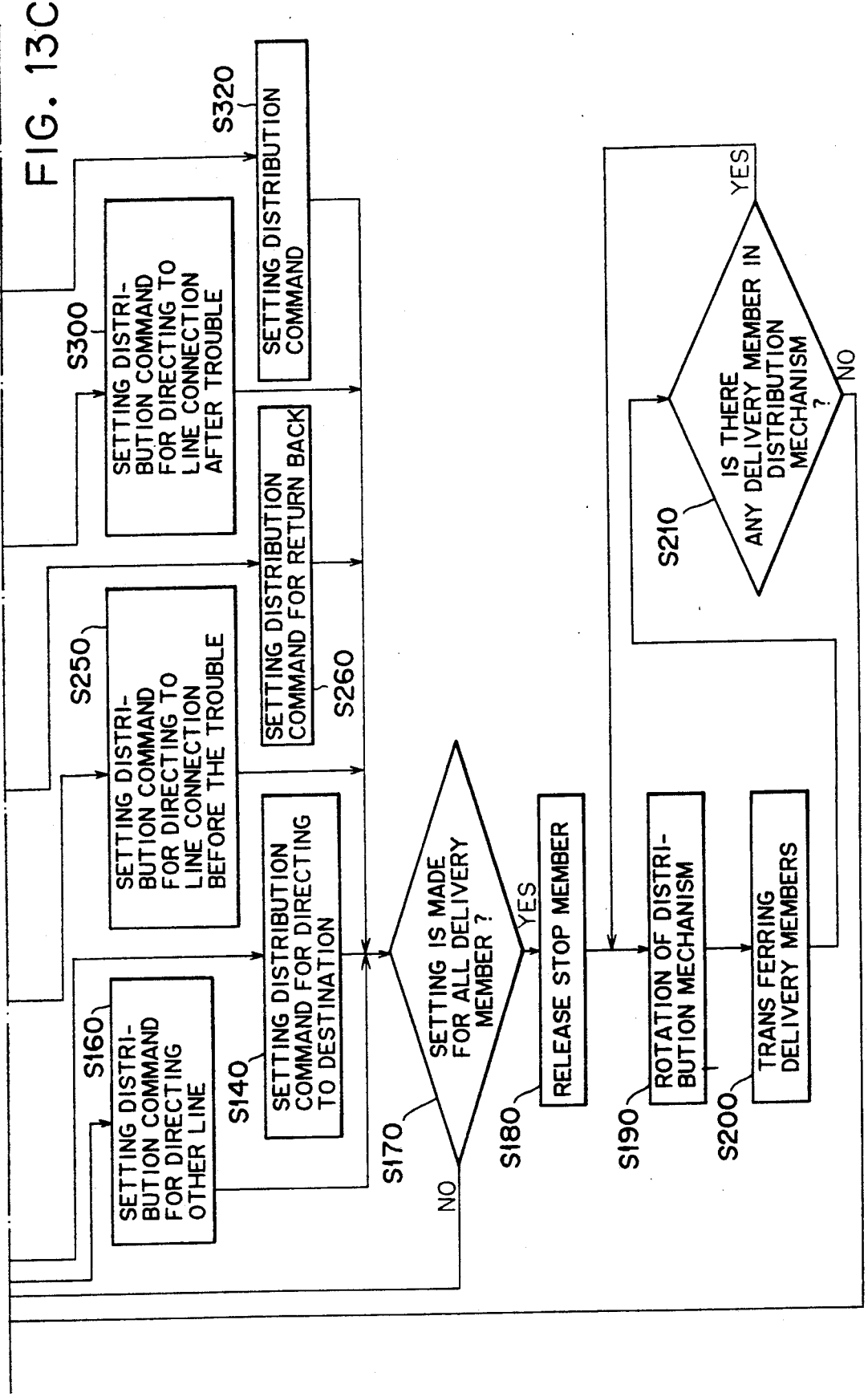

| DISTRIBUTION ARM NUMBER | ROTATION ANGLE | DESTINATION RAIL NUMBER | EXISTENCE OF DELIVERY |
|---|---|---|---|
| 1 | -135° | ② | 1 |
| 2 | | | 0 |
| 3 | 45° | ① | 1 |
| 4 | | | 0 |
| 5 | | | 0 |
| 6 | | | 0 |
| 7 | | | 0 |
| 8 | | | 0 |

78

82

1d → 1e

TRANSFERRING SYSTEM FOR TRANSFERRING DELIVERY MEMBERS TO THEIR DESTINATIONS THROUGH COMPUTED TRANSFER ROUTE

BACKGROUND OF THE INVENTION

The present invention relates to a transferring system for transferring a delivery member by suitably distributing or portioning-out the delivery member onto one of transferring rails in accordance with destination of the delivery member.

Conventionally, in a sewing factory, a delivery member which holds a goods in process such as a stitched product is transferred to a proper destination. Such transferring system for transferring the delivery member is described in a commonly assigned U.S. patent application Ser. No. 07/558,079, now pending. According to the disclosed arrangement, a transferring mechanisms and a transfer controlling means are provided. The transferring mechanism includes a plurality of distribution mechanisms connected to each other by a plurality of transferring rails on which the delivery member runs. The delivery member distributed by the distribution mechanism is directed to one of the transferring rails and is transferred by the transferring mechanism. The transfer controlling means controls the transferring mechanism such that each one of the delivery members is subjected to proper distribution on to the proper transferring rail in accordance with its destination.

According to the conventional transferring system, memory means is provided for storing therein mutually connecting information between the distribution mechanisms, that is, the information as to which two of the distribution mechanisms are connected together by the rail. On a basis of the "connecting information", the delivery member undergoes distribution to the corresponding transferring rail in accordance with the destination of the delivery member based on predetermined transferring rule.

However, during travel of the delivery member on the transferring rail toward its destination, which transfer is made on the basis of the transferring rule, if any trouble occurs which obstructs the transfer of the delivery member, for example, overflow occurs, the transferring operation is intermittently suspended until the trouble is eliminated. Therefore, processing period for the delivery member may be prolonged, to thereby lower the working efficiency. Further, if the distributing mechanism has its own impediment, the transferring rule must be largely revised in order to transfer the delivery member toward downstream area of the troubled distribution mechanisms. Thus, working efficiency is also lowered in this respect.

SUMMARY OF THE INVENTION

It is therefore, an object of the present invention to overcome the above described drawbacks and disadvantages, and to provide an improved transferring system in which working efficiency is not lowered but can be maintained even if any impediment occurs to obstruct the transfer of the delivery member during travel of the transfer member to its own destination on a basis of a predetermined transferring rule. That is, in such impediment state, the transferring system of this invention can distribute and transfer the delivery member by way of other transferring rail, to thereby maintain the working efficiency.

This and other object of this invention will be attained by a transferring system for transferring delivery members to their destinations, the system comprising (a) a transferring mechanism comprising a plurality of distribution mechanisms, and a plurality of transferring rails for connecting neighboring distribution mechanisms with one another, each of the delivery members being transferred on the transferring rails and being distributed to a selected one of the transferring rails so as to direct the delivery member to its destination, (b) a line connecting information storage means for storing line connecting information between the neighboring distribution mechanisms, (c) a transfer control means for controlling the transferring mechanism thereby distributing the delivery member to a proper transferring rails which is capable of directing the delivery member to its destination in accordance with a predetermined transferring rule on a basis of the line connecting information, (d) trouble storage means for storing a troubled location in the transferring mechanism which troubled location prevents the delivery member from being further transferred, (e) trouble judgment means for judging whether or not there is any troubled location on a route of the delivery member directing toward its destination, the route being in accordance with the predetermined transferring rule on the basis of the line connecting information, and (f) new route setting means for providing another route to permit the delivery member to direct to the destination when the troubled location exists in the transfer route.

BRIEF DESCRIPTION OF THE DRAWINGS

In the Drawings;

FIGS. 13, 13A, 13B, 13C show a flowchart for description of distribution control process executed in an electronic control circuit according to one embodiment of this invention;

DETAILED DESCRIPTION OF THE PREFERRED EMBODIMENT

Figure 2:
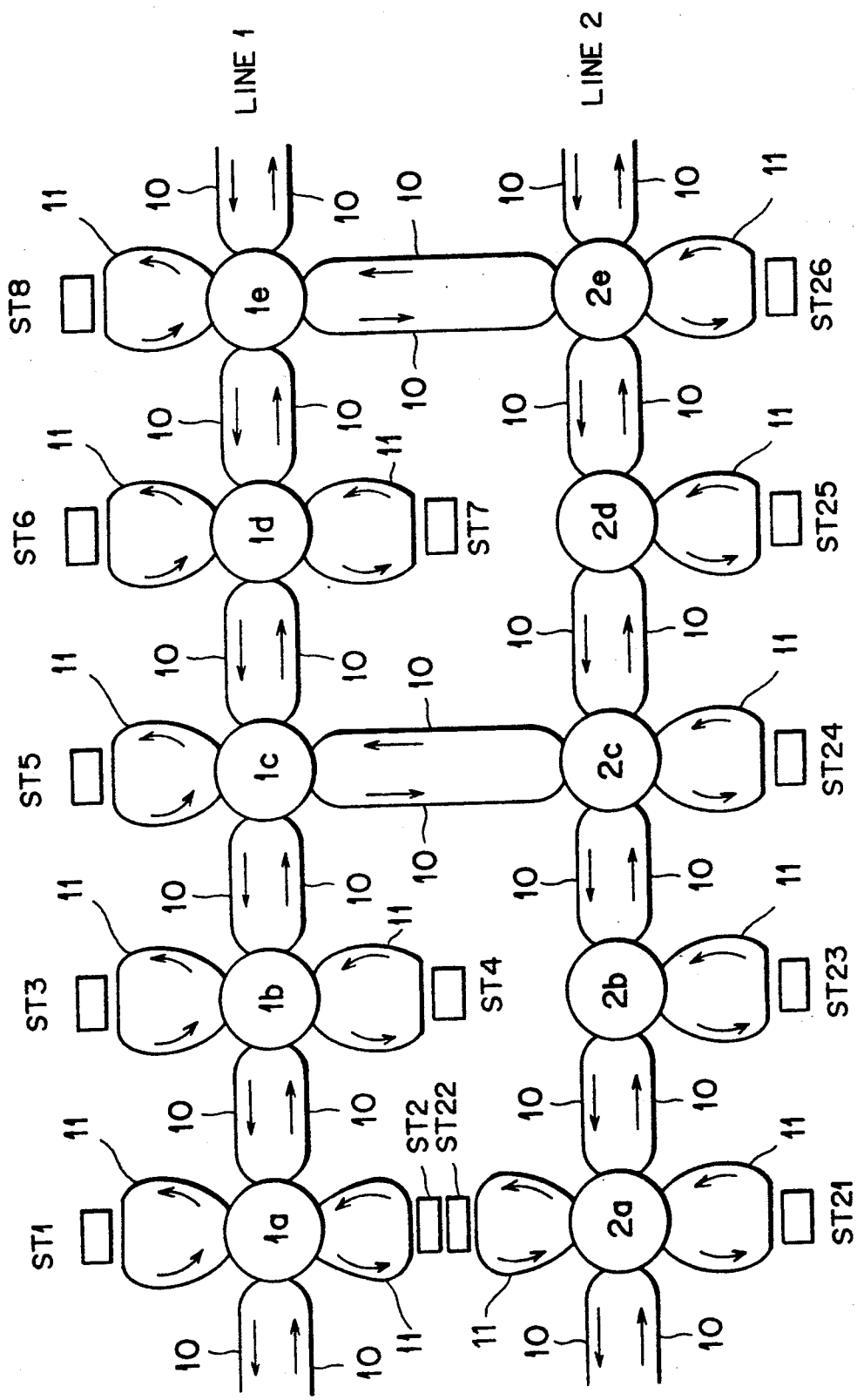
FIG. 2 is a schematic illustration showing layout of a transferring arrangement according to one embodiment of this invention.

The transferring system according to one embodiment of this invention is shown in FIG. 2. A first set of a plurality of distribution mechanisms 1a, 1b, 1c, 1d and 1e are positioned spaced away from each other, and neighboring distribution mechanisms are connected together by bridge rails 10. Thus, the first set of the distribution mechanisms are aligned in a linear array to thereby provide a first transferring line 1. Similarly, a second set of a plurality of distribution mechanisms 2a, 2b, 2c, 2d and 2e are positioned spaced away from each other, and neighboring distribution mechanisms are connected together by bridge rails 10. Thus, the second set of the distribution mechanisms are aligned in a second linear array and directed in parallel with the first array or line 1 to thereby provide a second transferring line 2. Further, one of the distributing mechanisms among the first line 1 is connected to one of the distributing mechanisms among the second line 2 by a bridge rail 10. In the illustrated embodiment, the distributing mechanism 1c of the first line 1 is connected to the distributing mechanism 2c of the second line 2, and the distributing mechanism 1e of the first line 1 is connected to the distributing mechanism 2e of the second line 2. The distributing mechanisms 1a through 2e have structures identical with one another, and therefore, description will be made on one of the distributing mechanisms 1a.

Figure 3:
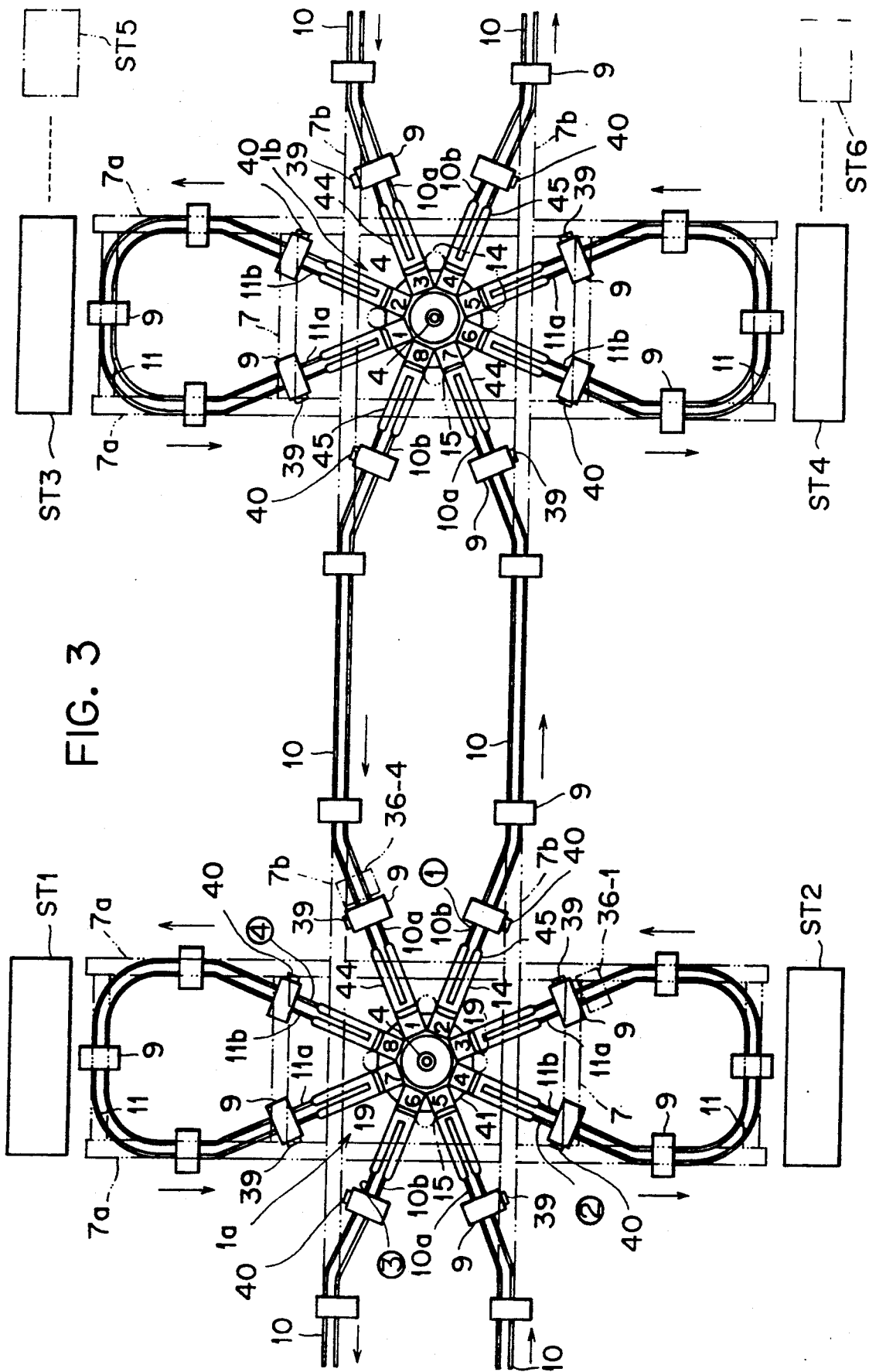
FIG. 3 is a plan view particularly showing transferring rails of the transferring system according to one embodiment of this invention.
Figure 4:
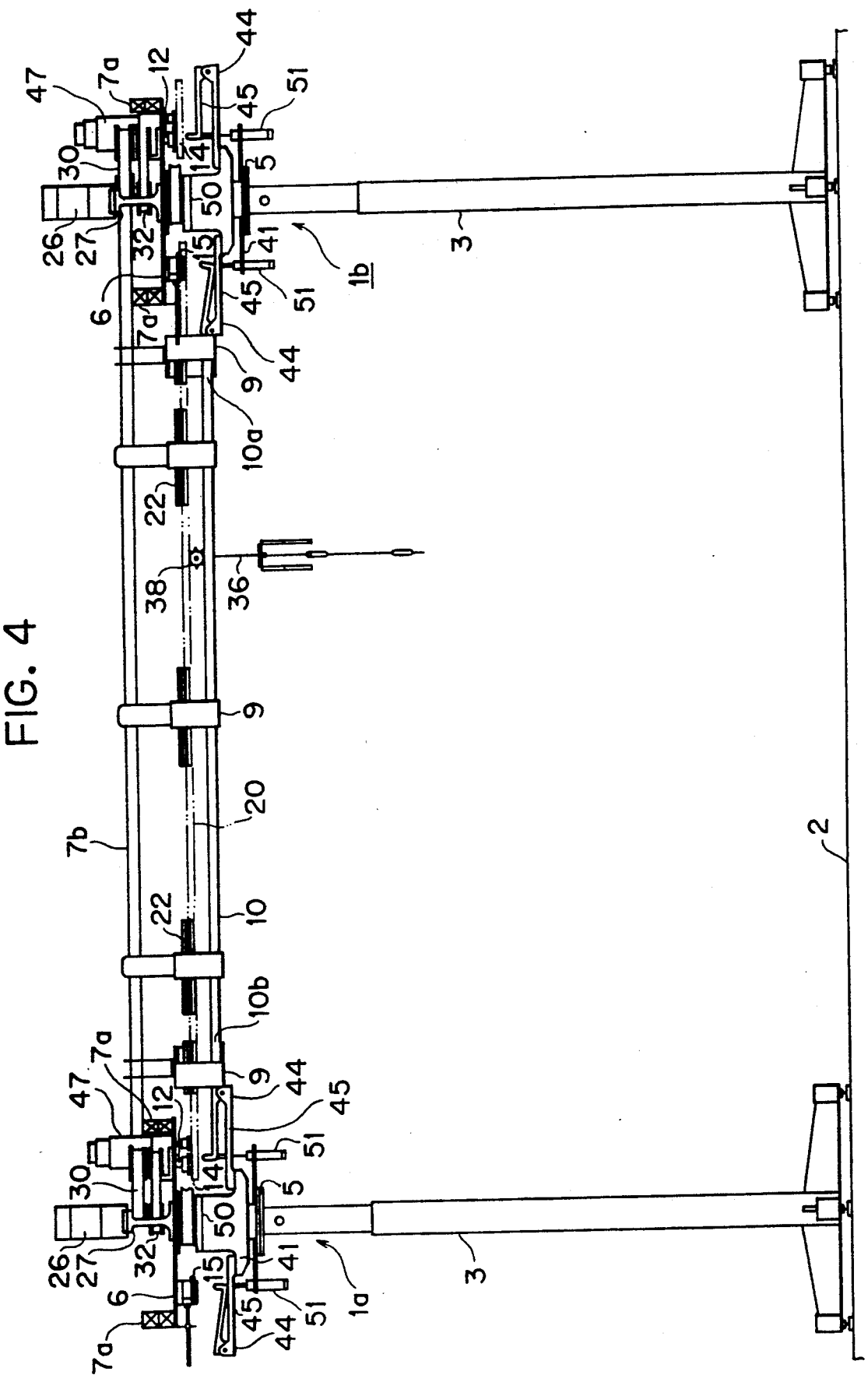
FIG. 4 is a side view of the transferring arrangement shown in FIG. 3.
Figure 5:
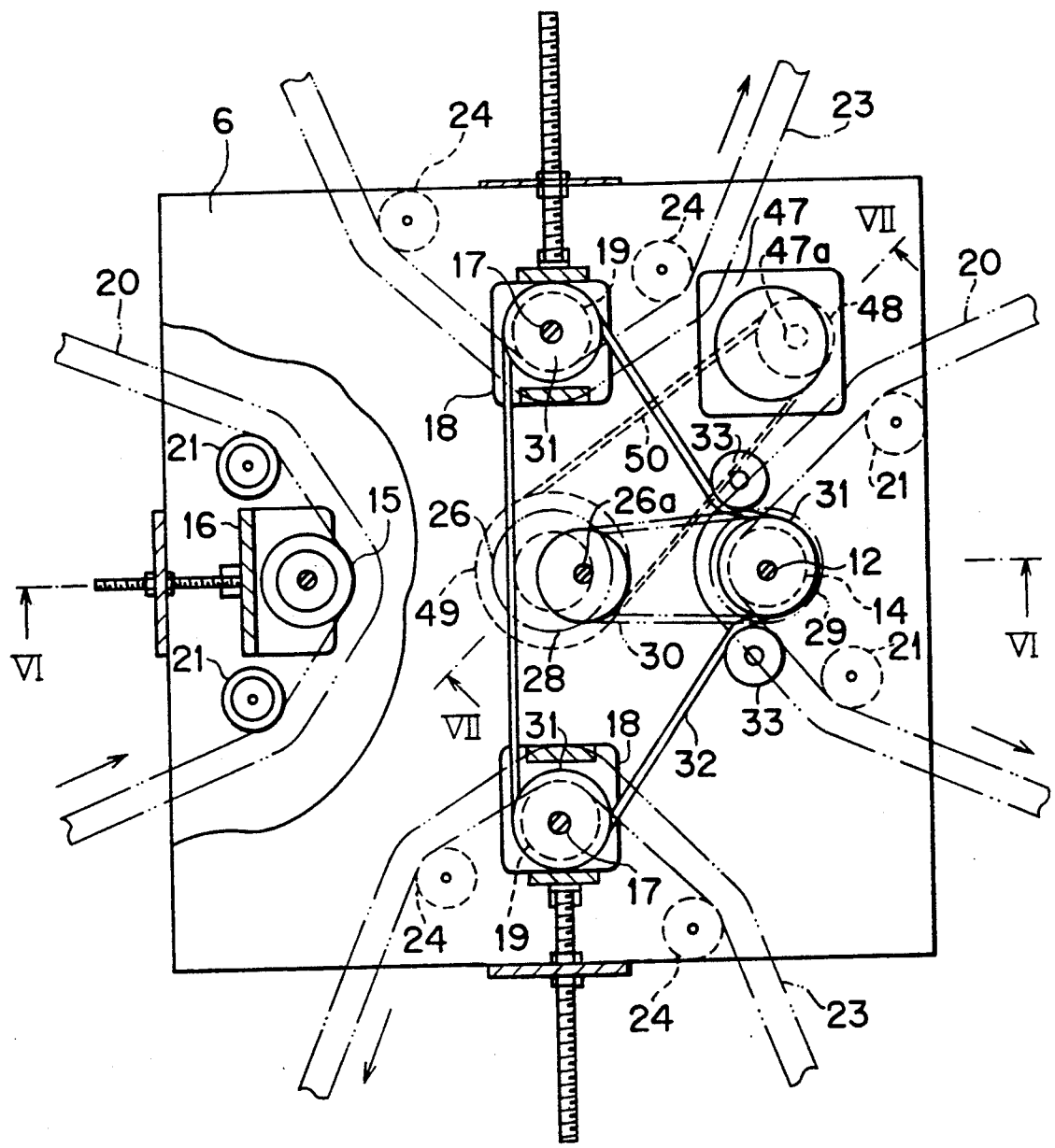
FIG. 5 is a plan view showing a driving arrangement of a distributing mechanism of the transferring system according to one embodiment of this invention.

As shown in FIGS. 3 through 5, the distributing mechanism 1a has a support post 3 vertically extending from a floor 2, and a support shaft 4 is upstandingly disposed on an upper end of the support post 3 through an attachment stand 5. The support shaft 4 has an upper end to which a support plate 6 is fixedly secured. Further, an intermediate portion of a support frame 7a having an oblong rectangular shape is fixedly mounted on an upper face of the support plate 6 The support frame 7a is adapted to support a station rail 11 described later. Furthermore, another support frame 7b is also disposed on support plates 6 of the distributing mechanisms 1a, 1b, 1c, 1d and 1e (similar to the second line 2). The other support frame 7b extends perpendicular to the first support frame 7b for supporting a pair of bridge rails 10 (described later) extending in parallel with each other.

At positions around the distributing mechanisms, work stations ST1 through ST8 and ST21 through ST26 are provided. The first support frame 7a which supports the station rail 11 extend toward the work station St from the second support frame 7b which supports the bridge rail 10.

Each pair of the above described bridge rails 10 are positioned between the neighboring distributing mechanisms. The bridge rails 10 are suspended from the first and second support frames 7a and 7b by a plurality of suspension jigs 9 as best shown in FIG. 4. The station rail 11 is suspended from the first support frame 7a by the suspension jig 9 and has a horseshoe shape for transferring a delivery member 36 via the work station ST1 positioned around the distributing mechanism 1a. The bridge rail 10 and the station rail 11 constitute, in combination, a transferring rail 8.

End portions of the bridge rail 10 are provided with an inlet rail portion 10a and an outlet rail portion 10b, and end portions of the station rail 11 are provided with an inlet rail portion 11a and an outlet rail portion 11b. These inlet and outlet rail portions 10a, 10b, 11a, 11b are positioned at the same vertical height, and are spaced away from each other angularly equidistantly (in the illustrated embodiment, these rail portions are arranged by every 45 degrees).

As shown in FIG. 3, there are totally four outlet rail portions 10b, 10b, 11b, 11b at positions around the support shaft 4 of one distributing mechanism 1a. Thus, in order to distinguish one of the outlet rail portions from the remaining outlet rail portions, these portions are blotted with numbers (1) through (4). Incidentally, the above described work stations ST1 through ST26 are constituted by sewing device or sewing machines those positioned below the station rails 11.

Figure 6:
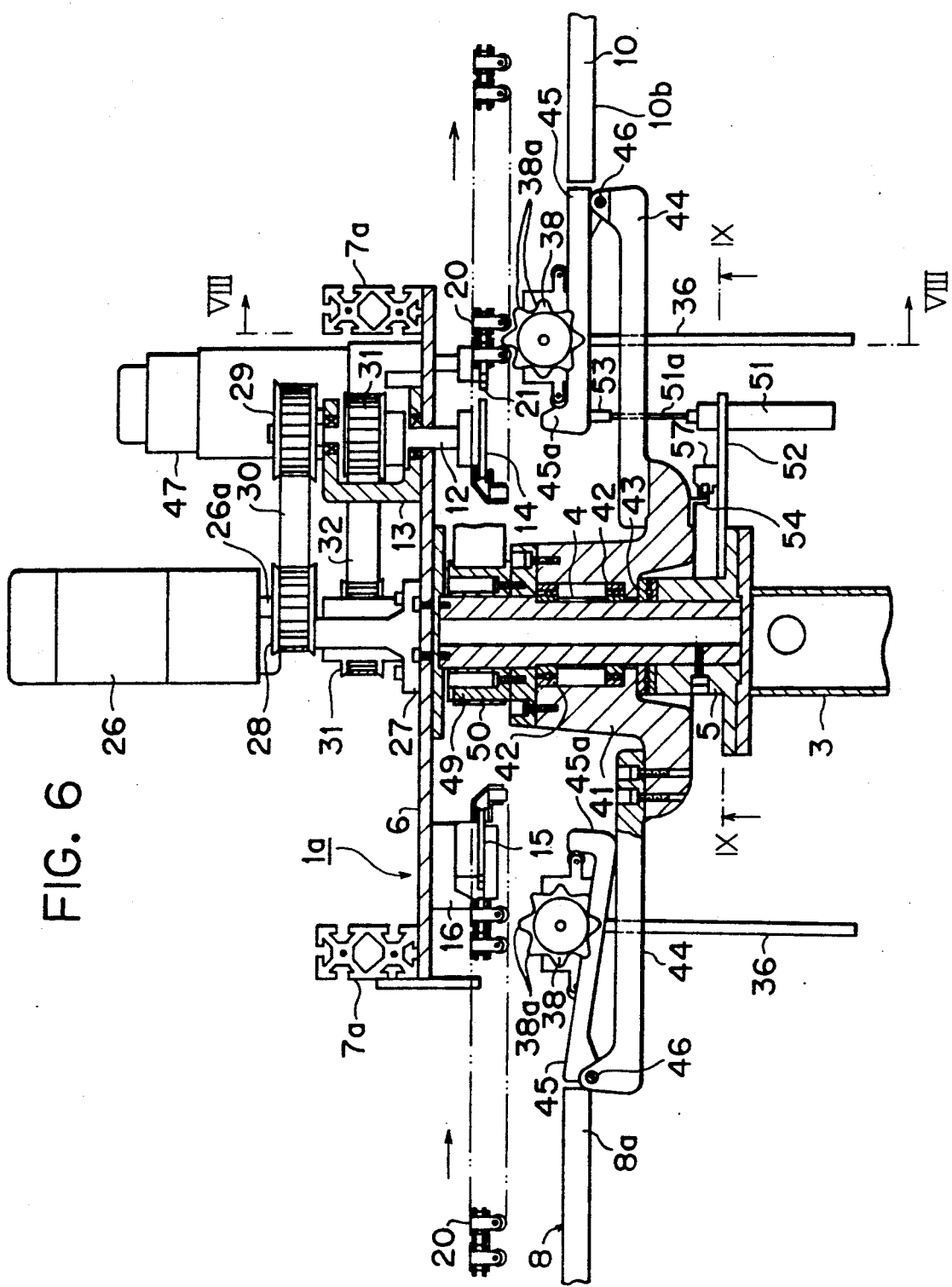
FIG. 6 is a cross-sectional view taken along a line VI—VI of FIG. 5.

As shown in FIGS. 5 and 6, a rotation shaft 12 rotatably extends through the support plate 6 through a stationary bracket 13 fixed to the plate 6. The lower end portion of the rotation shaft 12 is fixed with a drive sprocket 14. Further, a driven sprocket 15 is rotatably positioned immediately below the support plate 6 at a position opposite the drive sprocket 14 with respect to the support shaft 4. The driven sprocket 15 is provided rotatable and position-controllable by way of a movable bracket 16. The movable bracket 16 is movably secured to the support plate 6 as best shown in FIG. 5. A pair of co-operational rods 17 and 17 rotatably extend through the support plate 6 through a movable brackets 18 movably secured to the support plate 6. The co-operational rods 17, 17 are position-controllable and are positioned between the drive and driven sprockets 14 and 15. Lower ends of the cooperative rods 17, 17 are fixed with cooperative sprockets 19 and 19.

A pair of guide sprockets 21 and 21 are rotatably provided to the lower face of the support plate 6 at positions adjacent the driven sprocket 15. Further, another pair of guide sprockets 21 and 21 are rotatably provided to the lower face of the support plate 6 at positions adjacent the drive sprocket 14. A first endless chain 20 is mounted between the driven sprocket 15 and a drive sprocket (not shown in FIG. 5) of a neighboring distributing mechanism. (The first endless chain 20 is mounted between the drive sprocket 14 and a driven sprocket (not shown) of a neighboring distribution mechanism in FIG. 5) The above described suspension jig 9 is provided with a chain guide 22 (FIG. 4). Thus, the first endless chain 20 can be positioned along the bridge rails 10 and 8(FIG. 6) through the guide of the guide sprockets 21, 21 and the chain guide 22 as best shown in FIG. 4.

Further, each pair of guide sprockets 24 24 are rotatably secured to the lower face of the support plate 6 and are positioned adjacent the cooperational sprockets 19 and 19. A second endless chain 23 is mounted between one of the cooperational sprockets 19 and a cooperational sprocket (not shown) of a neighboring distribution mechanism as best shown in FIG. 5. Thus, the second endless chain 23 can be positioned along the station rail 11 through the guide of the guide sprockets 24, 24 and the chain guide (not shown).

In FIGS. 4 through 6, a chain drive motor 26 is positioned on the support plate 6 through a support leg 27. The chain drive motor 26 has a motor shaft 26a fixedly provided with a drive pulley 28. Further, the rotation shaft 12 has an upper end portion fixedly provided with a driven pulley 29, and a timing belt 30 is mounted between the drive and driven pulleys 28 and 29. One cooperation pulley 31 is fixed to an intermediate portion of the rotation shaft 12 (FIG. 6), and two cooperation pulleys 31 are fixed to upper end portions of the cooperational rods 17 and 17. A timing belt 32 is mounted on these three cooperation pulleys 31. A pair of tension pulleys 33 are provided to the upper surface of the support plate 6 so as to apply tension to the timing belt 32.

Figure 8:
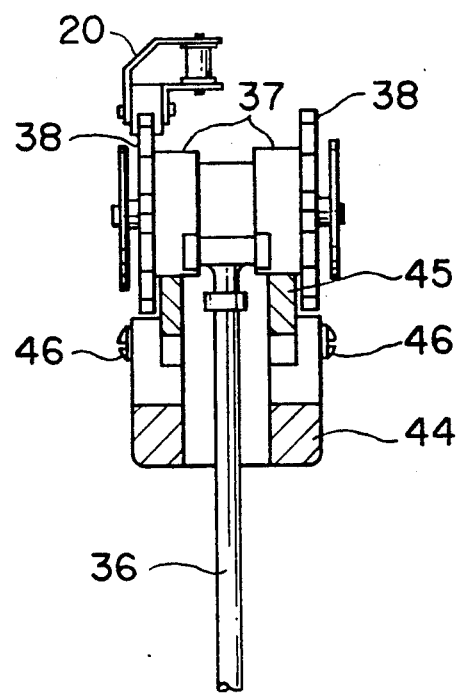
FIG. 8 is a cross-sectional view taken along a line VIII—VIII of FIG. 6.

In FIGS. 4, 6 and 8, the delivery member 36 is movable on the bridge rail 8 or 10 and the station rail 11 through a pair of rollers 37. The delivery member 36 has a hanger shape for suspending a stitched product. A pair of engagement wheels 38 38 are rotatably connected to the delivery member 36. Each of the engagement wheels 38 has an outer peripheral portion formed with a plurality of teeth 38a engageable with one of the first and the second endless chains 20 and 23. Normally, rotation of the engagement wheels are prevented by a friction means (not shown). With this state, if the teeth 38a of the engagement wheel 38 is brought into engagement with one of the endless chains, the delivery member 36 is moved or transferred on the bridge rail 10 or the station rail 11 because of the driving movement of the chain 20 or 23.

As shown in FIG. 3, number reading device 39 are attached to the suspension jigs 9 at the inlet rail portions 10a and 11a of the bridge rail 10 and the station rail 11. When the delivery member 36 is transferred, along the bridge rail 10 or the station rail 11, to a position confronting the one of the number reading device 39, further transfer of the delivery member 36 is restrained by a stop means (not shown), so that the delivery member 36 is temporarily stopped in confrontation with the number reading device 36. The delivery member 36 is printed with a code mark (not shown) indicative of a number, and the number reading device 39 reads the code mark. Incidentally, when the delivery member is stopped, the endless chain 20 or 23 is driven. However, in this case, the engagement wheel 38 is idly rotated in accordance with the driving movement of the endless chain against the friction force imparted by the friction means (not shown).

Further, as shown in FIG. 3, overflow switches 40 are attached to the suspension jigs 9 at the outlet rail portions 10b and 11b of the bridge rail 10 and the station rail 11. More specifically, the rails 10 and 11 are occupied by the predetermined numbers of the delivery members 36. In this case, a trailing end delivery member 36 is crowded out of the rail 10 and 11 and is positioned onto the outlet rail portion 10b, 11b. In such case, it becomes impossible to position still another delivery member 36 onto the rail 10 or 11. Therefore, the overflow switch 40 detects the crowded out delivery member 36 and generates detection signal.

Figure 7:
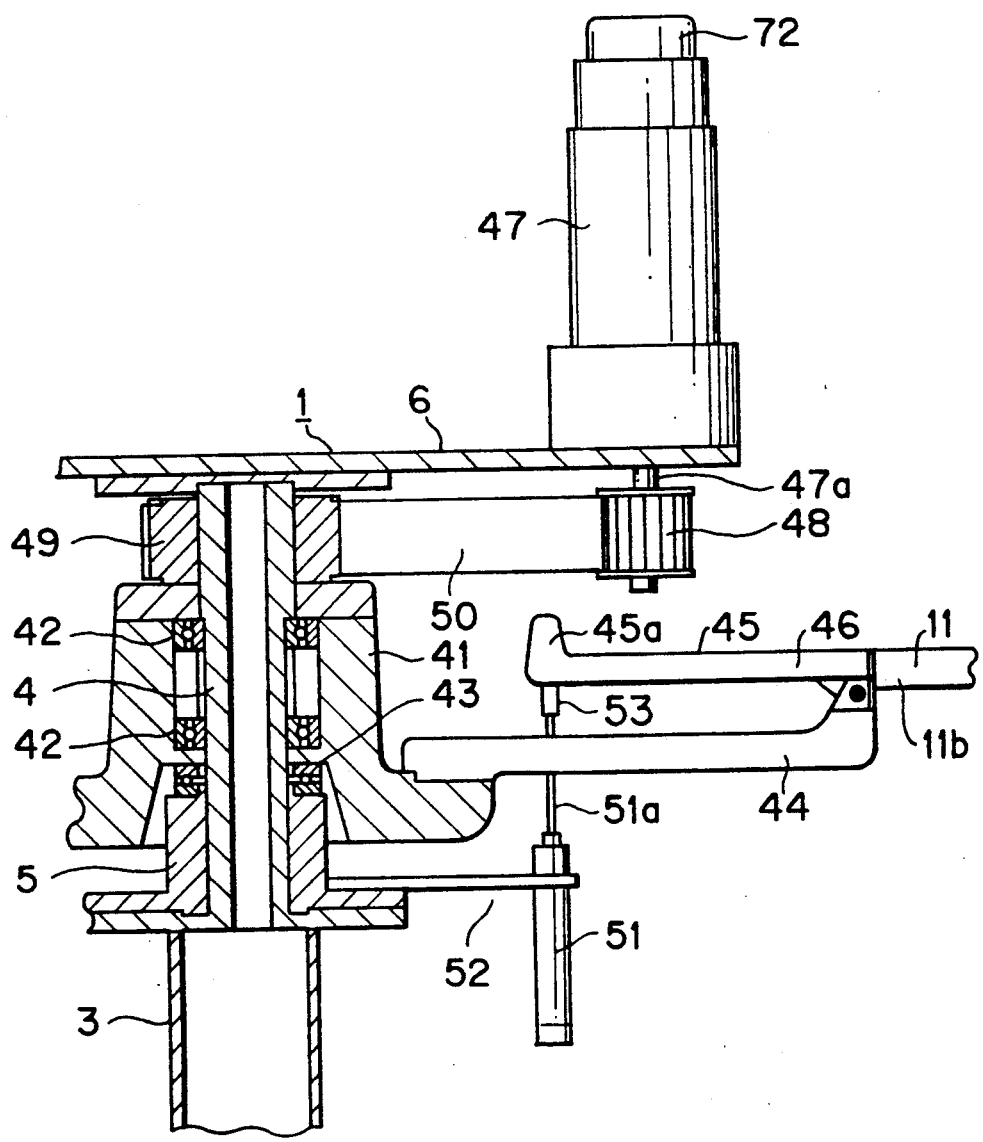
FIG. 7 is a cross-sectional view taken along a line VII—VII of FIG. 5.

As shown in FIGS. 6 and 7, a rotary member 41 is rotatably supported, through a radial bearing 42, over the support shaft 4 of the distributing mechanism 1a, and a thrust bearing 43 is interposed between the rotary member 41 and the attachment stand 5. The rotary member 41 has a plurality of (eight) distribution arms 44 radially extending from an outer peripheral surface of a body of the rotary member 41. The distribution arms 44 are equi angularly spaced from each other so as to confront the inlet and outlet rail portions 10a, 11a, 10b, 11b. These distribution arms 44 extend to driving regions of the first and second endless chains 20 and 23.

Figure 9:
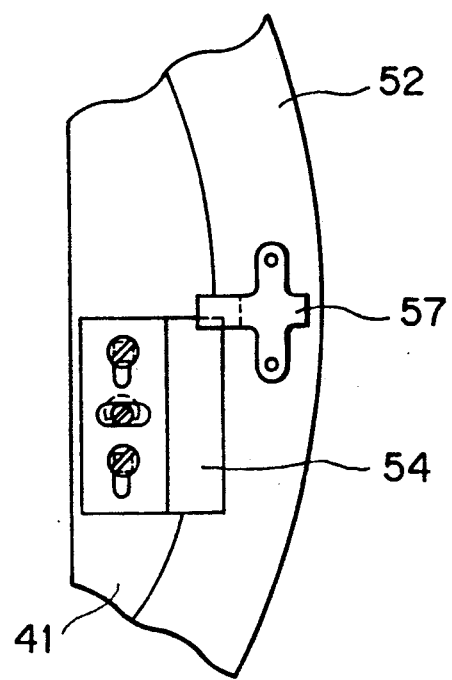
FIG. 9 is a cross-sectional view taken along a line IX—IX of FIG. 6.

As shown in FIGS. 6 and 9, detected members 54 are attached to a lower surface of the rotary member 41 at positions corresponding to the distribution arms 44. A support plate 52 is mounted on the attachment stand 5, and a detector 57 is provided on the support plate 52 for detecting an edge portion of each of the detected members 54. Thus, origin of the rotary member 41 is detectable.

As shown in FIGS. 6 and 9, each free end of the distribution arms 44 is provided with a pivot shaft 46 for pivotally supporting one end portion of a retaining rail or a pivot arm 45 which holds the delivery member 36. Another end portion of the retaining rail 45 is provided with an engagement protrusion 45a. As shown at left half portion of FIG. 6, the retaining rail 45 is normally slanted such that the engagement protrusion 45a is at its descent position because of the weight of the retaining rail 45. When the delivery member 36 is transferred from one of the inlet rail portion 10a and 11a of the bridge rail 10 and the station rail 11 to the distribution arm 44 by means of the first or second endless chain 20 or 23, the delivery member 36 runs along the slanted surface of the retaining rail 45, and reaches the engagement protrusion 45a, i.e., the position of the delivery member 36 is lowered. Therefore, the engagement wheel 38 is disengageable from the first or second endless chain 20 or 23.

As best shown in FIG. 7, a reversible servo motor 47 for angularly rotating the distribution arm 44 about the axis of the support shaft 4 is fixedly mounted on the support plate 6. The reversible servo motor 47 has a motor shaft 47a extending through the support plate 6, and a drive pulley 48 is fixedly secured to the motor shaft 47a. Further, a driven pulley 49 is positioned between the support plate 6 and the rotary member 41, and is fixedly secured to the support shaft 4. A timing belt 50 is mounted between the drive and driven pulleys 48 and 49. In accordance with the rotation of the reversal servo motor 47 in a normal or reverse direction, the rotary member 41 is rotatable about the axis of the support shaft 4 by every 45 degrees through the drive pulley 48, the timing belt 50 and the driven pulley 49. Therefore, the distribution arms 44 are angularly rotatably moved or indexed to positions confronting the predetermined bridge rail 10 or the station rail 11.

Incidentally, the servo motor 47 undergoes feed back control in accordance with the detection signal generated upon detection of the detected member 54 (see FIGS. 6 and 9) by the detector 56 (see FIGS. 6 and 9). Further, the servo motor 47 is provided with an encoder 72 for detecting rotation angle of the servo motor 47, so that the angular rotation angle of the distribution arm 44 is detectable.

Figure 10:
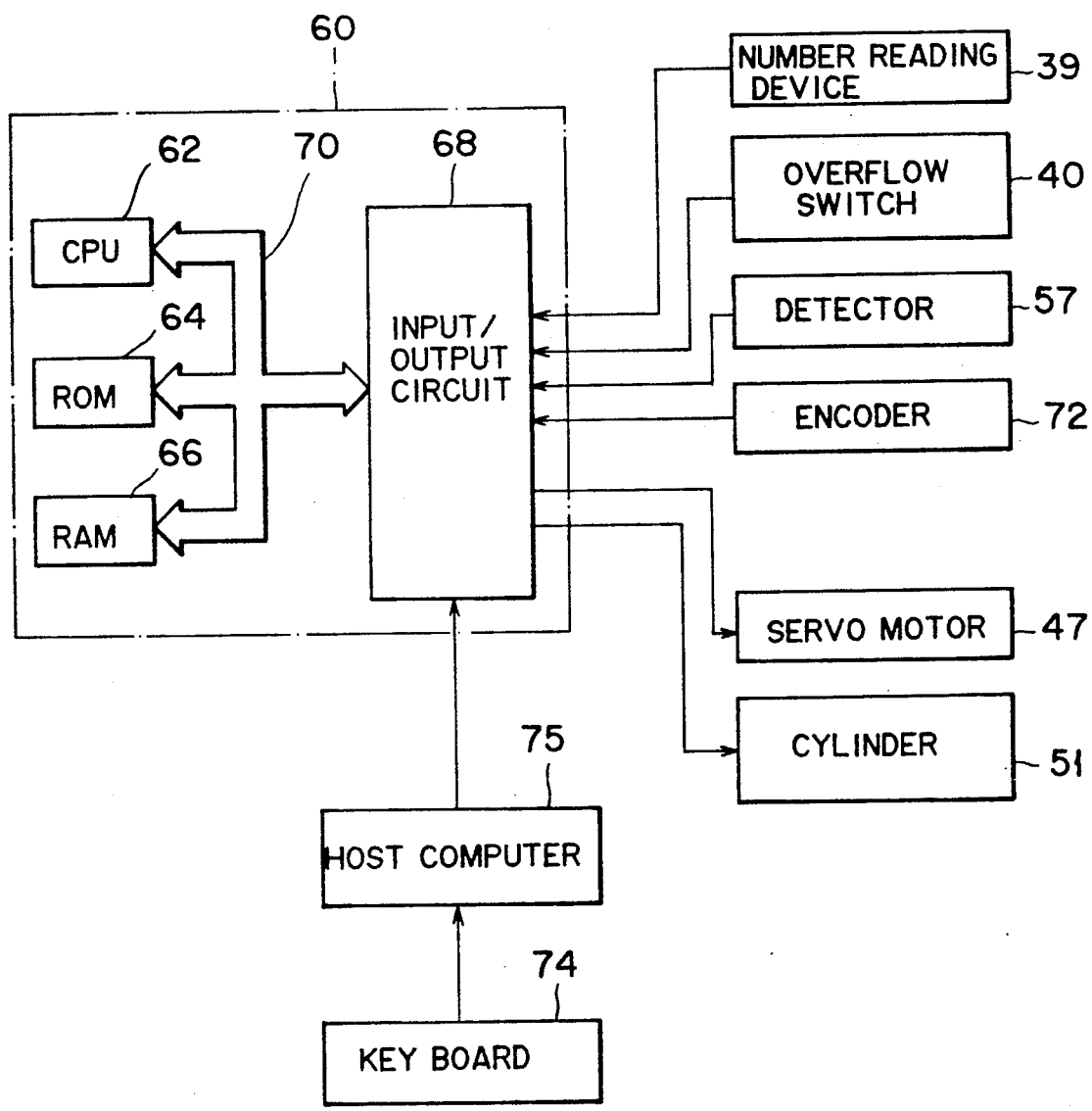
FIG. 10 is a block diagram showing an electrical arrangement according to one embodiment of this invention.

As shown in FIG. 4 and FIG. 6, vertically extendible cylinders 51 are fixedly supported by the support plate 52 supported by the attachment stand 5. The cylinder 51 are positioned below the distribution arms 44. Each of the cylinders 51 has a piston rod 51a whose upper end portion is provided with a depression member 53 abuttable against the retaining rail 45 positioned above the distribution arm 44. The piston rods 51a normally have their retracted positions. The piston rod 51a extends upwardly (see right half portion in FIG. 6), so that the retaining rail 45 previously having slanted posture is pivoted about the pivot shaft 46 to thereby provide a horizontal orientation because of the urging force from the depression member 53. Thus, the engagement wheel 38 of the delivery member 36 is brought into engagement with the first or second endless chain 20 or 23. Each of the cylinder 51 is provided with a control valve (not shown) which controls extension and retraction of the piston rod 51a Next, electrical arrangement in accordance with the present embodiment will be described with reference to a block diagram shown in FIG. 10. The above described components are controlled by an electronic control circuit 60 for transferring the delivery members 36. The electronic control circuit 60 includes a logical operation circuit primarily provided with a CPU 62, a ROM 64 and a RAM 66 those being connected, through a common bus 70, to an input/output circuit 68 adapted to be connected to an external equipments. Signals from the number reading device 39, the overflow switch 40, the detector 57, the encoder 72 and a host computer 75 (described later) are inputted into the CPU 62 through the input/output circuit 68. In accordance with these signals and data stored in the ROM 64 and the RAM 66, the CPU 62 generates output drive signal for controlling the servo motor 47 and generates another output drive signal for controlling the control valve (not shown) of the cylinder 51, to thereby control operation mode of the cylinder 51.

The electronic control circuit 60 is provided for each of the distribution mechanisms 1a, 1b, ... 2a, 2b ..... and a plurality of the electronic control circuits 60 are connected to the host computer 75 for overall control to the entire transferring system The host computer 75 is connected to a key board 74 for determination of delivery orders of the respective delivery members 36 in accordance with working process with respect to the stitched products. The host computer 75 generates output signal to the respective electronic control circuits 60 so as to instruct the destination of the delivery member, i.e., the host computer 75 generates the destination signals for each of the delivery members 36 to let the delivery member to proceed into the next working station ST1 .... The electronic control circuit 60 stores therein the instructions of destination sent from the host computer 75 in a table like fashion 76 shown in FIG. 11. The table 76 can be referred to as a destination command table 76.

Incidentally, the transfer order can be inputted directly into the each of the electronic control circuits 60, and the destination commands with respect to each one of the delivery members 36 can be stored in the respective electronic control circuits 60. In this case, if the delivery member 36 reaches the instructed working station ST, and predetermined working is completed in the station, the electronic control circuits 60 receives a work completion signal. In response to the work completion signal, next destination command indicative of the destination for the delivery member 36 is inputted, and the destination command table 76 can be rewritten.

In the RAM 66 of the each of the electronic control circuits 60, interconnection informations are stored. That is, the RAM 66 stores therein the information as to which two of the distribution mechanisms between the first and second transfer lines 1 and 2 are connected with each other through the bridge rail 10. In the illustrated embodiment shown in FIG. 2, the distribution mechanism 1c of the first line 1 is interconnected with the distribution mechanism 2c of the second transfer line 2 through the bridge rail 10, and the distribution mechanism 1e of the first transfer line 1 is interconnected with the distribution mechanism 2e of the second transfer line 2. Incidentally, neighboring distribution mechanisms in the same transferring line, for example 1a-1b, 1b-1c, 1c-1d, 1d-1e are all connected with each other. These connecting informations with respect to the identical line are not stored in the RAM.

Figure 13B:
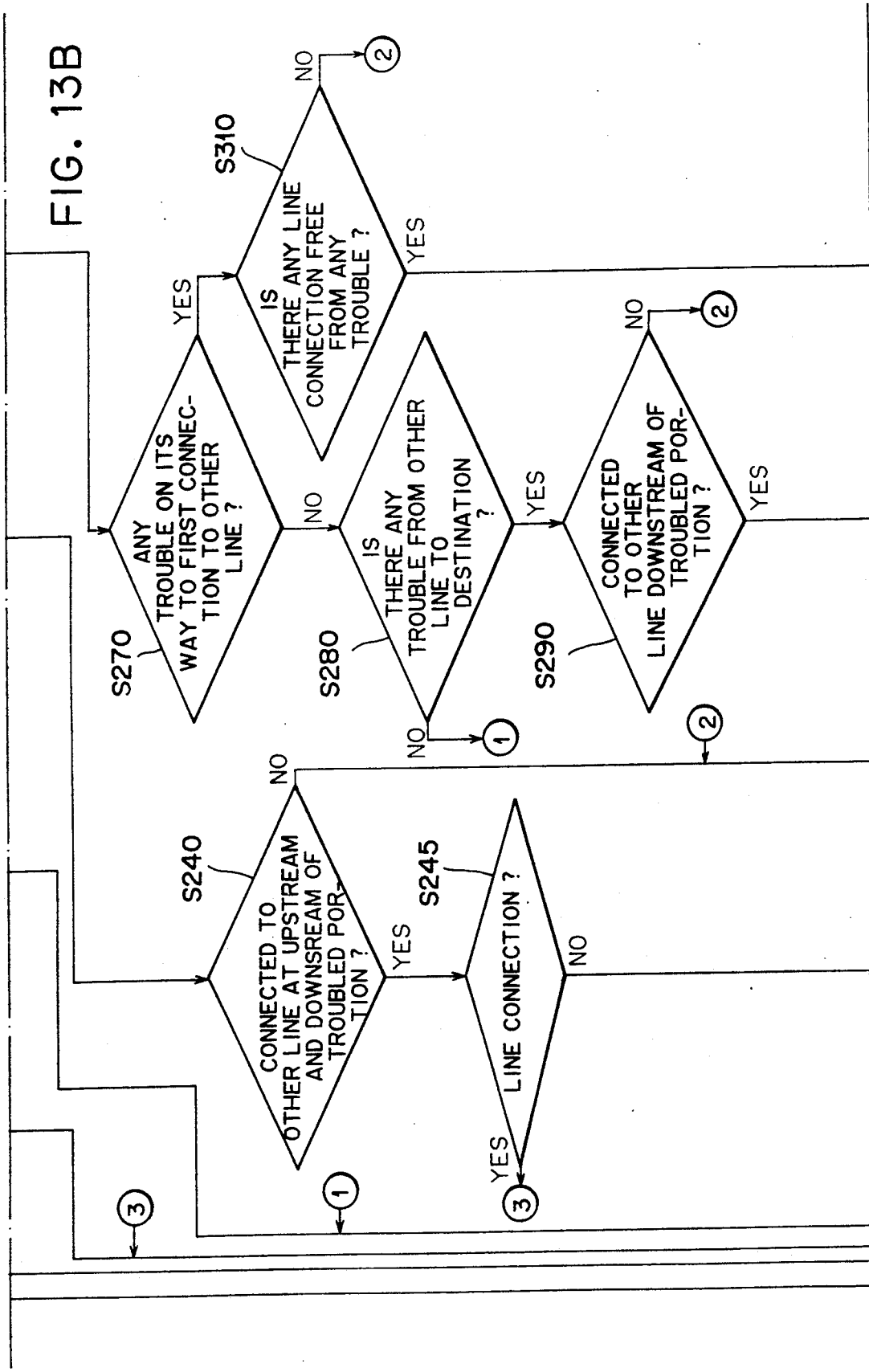

Next operation of the transferring system and control routine executed by the electronic control circuit 60 will be described with reference to a flowchart shown in FIG. 13.

First, when the chain drive motor 26 provided in the distributing mechanism 1a is rotated, as shown in FIGS. 4 and 5, the first endless chain 20 is circularly driven along the bridge rail 10 in a counterclockwise direction in FIG. 5 (shown by arrows) through the drive pulley 28 and the timing belt 30, etc. Further, the second endless chain 23 is also circularly moved along the station rail 11 in the same direction through the rotation of the rotation shaft 12, the cooperation pulley 31 and the timing belt 32, etc.

Therefore, the delivery member 36 on the bridge rail 10 or the station rail 11 is moved therealong in the direction indicated by an arrow in FIG. 2 since the engagement wheel 38 of the delivery member 36 is engaged with the first or second endless chain 20 or 23.

The delivery member 36 is transferred along the bridge rail 10 and is brought to a position confronting the number reading device 39. Then, the delivery member 36 is temporarily stopped by the stop means (not shown). In this case, judgment is made in Step S100 in FIG. 13 as to whether or not there is delivery member 36 which should be transferred into the distribution mechanism 1a. The delivery member 36 is affixed with identification numbers which identifies or distinguish the delivery member from one another, and the above judgment is made as a result of whether or not the number reading device 39 reads the identification numbers of the delivery member 36. If the judgment falls Yes (if the delivery member must be transferred into the distribution mechanism), the following distribution control will be executed.

Next, in Step S110, stored is the existence of the delivery member 36 to be transferred into the distribution arm 44. This storage is made with respect to every one of the distribution arms 44. According to the illustrated embodiment, the distribution arms 44 are distinguished from one another by affixing distribution arm numbers 1 through 8 to the corresponding distribution arms 4. The number reading device 39 reads the identification numbers of the delivery member 36 positioned at the inlet rail portions 10a or 11a confronting the distribution arm 44 having a given arm number. Then, stored is the existence or non-existence of the delivery member at that position by the representation of "1" (existence9 or "0" (non-existence) as shown by a delivery member distribution table 78 shown in FIG. 14. Incidentally in the present embodiment, maximum numbers of four delivery members can be simultaneously transferred onto the distribution arms 44 since totally four inlet rail portions 10a and 11a are provided.

Then, in Step S120, judgment is made as to whether or not there is any trouble which prevents the delivery member from being transferred. This judgment is made in accordance with a determination as to whether or not troubled location is stored in a trouble information table 82 shown in FIG. 15. The troubled location may be the bridge rail 10 where the transfer of the delivery member is prevented due to any trouble such as overflow of the delivery members, or may be the distribution mechanism 1a, 1b, . . . 2a, 2b . . . , where the distribution of the delivery member cannot be carried out due to any trouble such as mechanical or electrical malfunction in the distribution mechanism.

In the illustrated embodiment, a bridge rail 10 for transferring the delivery member 36 from the distribution mechanism 1a to the distribution mechanism 1b is provided separate from a bridge rail 10 for transferring the delivery member 36 from the distribution mechanism 1b to 1a. If any trouble is arisen in the former transferring direction, the table indicates the trouble location of "1a-1b", and if any trouble is arisen in the latter transferring direction, the table indicates the trouble location of "1b-1a". Further, if any trouble occurs in the distribution mechanism such as 1c in FIG. 2, the trouble location of "1c" is stored. These trouble locations are governed by the host computer 75. That is, signals from the overflow switches 40 (which may be the trouble signals) and/or trouble signals from the distribution mechanism 1a, 1b, . . . , are outputted into the host computer 75. These trouble locations are informed to the every distribution mechanisms 1a, 1b, . . , so that each of the distribution mechanisms can have information as to which one of the locations in the transferring system accompanies the trouble. These trouble locations are stored in the RAM 66.

If determination in the Step 120 concludes that no trouble location exists, then, the routine goes to Step S130. In the Step S130, the destination of the delivery member 36 is read based on the identification numbers read by the number reading device 39 with reference to the destination command table 76 shown in FIG. 11, and judgment is made as to whether or not the destination is on the same transfer line. If the judgment falls Yes, distribution command is set in Step S140.

For example, if the delivery member 36 affixed with the number 36-1 and imparted with the destination command toward the work station ST7 is positioned on a third distribution arm 44 (see FIG. 3 where "3" is allotted to the third distribution arm) of the distribution mechanism 1a of the first transfer line 1 (it should be noted that the work station ST7 is provided in the distribution mechanism 1d of the identical first transfer line 1), the angular rotation angle of 45 degrees with respect to the third distribution arm 44 and the first rail number "1" (see FIG. 3 where "1" is allotted with respect to the rail 10) are derived and stored, so that the delivery member 36-1 can be directed toward the work station ST7 through the optimum bridge rail 10 (marked with "1" in FIG. 3).

Figures 11, 12:
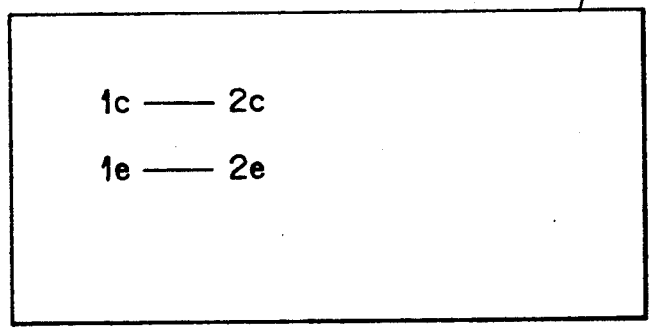
FIG. 11 is an illustration showing a table which indicates destinations of the delivery members.
FIG. 12 is a view showing a table which contains information of line-connection in a transferring mechanism according to one embodiment of this invention.

On the other hand, in the Step 130, if the delivery member 36 located at one of the transfer lines must be transferred to the other transfer line, the judgment in the Step 130 falls No Then, the routine goes into Step S150 where judgment is made as to whether or not the distribution mechanism 1a where the delivery member is located is interconnected with the other transfer line with reference to a line connection information table 80 shown in FIG. 12. If the judgment in the Step 150 falls Yes, the angular rotation angle of the distribution arm 44 and the optimum bridge rail 10 are determined for transferring the delivery member to the other transfer line in Step S160.

For example, if a delivery member 36 imparted with the destination command toward the work station ST26 is positioned on the distribution mechanism 1c of the first transferring line 1, angular rotation amount of a distribution arm in the distribution mechanism 1c and the destinations rail number are determined and stored so that the delivery member can be transferred to the other transferring line through the proper bridge rail 10. In this case, this distribution command can be valid, since as shown in FIGS. 2 and 12 the distribution mechanism 1c of the first transfer line 1 is interconnected with the distribution mechanism 2c of the second transfer line 2, and since the work station ST26 is located in the distribution mechanism 2e of the second transfer line 2.

On the other hand, if a distribution mechanism of one transfer line is not connected to a distribution mechanism of the other transfer line, the judgment in the Step S150 falls No, and the routine goes to the Step S140, so that the delivery member is transferred along the same transfer line.

The distribution control process is executed independent of one another at every electronic control circuit 60 of every distribution mechanisms. For example, if the delivery member 36 whose destination is directed to the work station ST26 (in the second transfer line 2) is transferred into the distribution mechanism 1a (in the first transfer line 1), its electronic control circuit 60 execute the programs of S130 through S150 and sets the destination command in order to transfer the delivery member 36 to the neighboring distribution mechanism 1b. The same is true with respect to the neighboring distribution mechanism 1b where the distribution command is set so as to transfer the delivery member to the next distribution mechanism 1c.

The distribution mechanism 1c of the first transfer line 1 is connected to the distribution mechanism 2c of the second transfer line 2, and this interconnection is the first connection between the first and second transfer lines 1 and 2 on the way of the delivery member 36 from the distribution mechanism 1a to the work station ST26. Therefore, as a result of the process executed in the Steps S150 and S160, in the distribution mechanism 1c, distribution command is set so as to direct the delivery member 36 toward the distribution mechanism 2c of the other transfer line 2.

In the distribution mechanism 2c, distribution command is set to direct the delivery member to the distribution mechanism 2d, and in the distribution mechanism 2d distribution command is set to direct the delivery member to the distribution mechanism 2e. And in the distribution mechanism 2e, distribution command is set so as to direct the delivery member to a station rail 11 which directs toward the work station ST26.

Thus, a predetermined transferring rule is established by the above described processing in the Steps S130 through S160. In summary, the delivery member undergoes judgment as to whether or not its destination is on the same transfer line. If Yes, the delivery member is transferred along the same transfer line, and if No, the delivery member is transferred to the other transfer line through distribution mechanisms firstly interconnected with each other with respect to the traveling route of the delivery member.

If a plurality of the delivery members are mounted on a plurality of the distribution arms 44 of the identical distribution mechanism, in the Step S110, "1" are set which are indicative of the existence of the delivery members on the distribution arms, and the processings S120 through S160 are repeatedly carried out, so that all delivery members simultaneously transferred on the distribution arms 44 are subjected to distribution command in Step S170 by storing and setting the angular rotation angles and destination rail numbers with respect to every one of the distribution arms 44.

Thus, necessary distribution commands are stored in the delivery member distribution table 78, and thereafter, the release command is issued to the stop means (not shown) in Step S180 for retracting the stop means, so that the transfer member 36 becomes movable. Accordingly, as shown in FIG. 3, the delivery member 36 can be transferred from the inlet rail portion 10a or 11a onto the distribution arm 44. By the entry of the delivery member onto the distribution arm 44, the delivery member 36 is moved downwardly along the slanting retaining rail or the pivot arm 45 until the delivery member is brought into abutment with the engagement protrusion 45a. Therefore, the engagement wheel 38 is disengaged from the first or second endless chain 20 or 23. Thus, the delivery member 36 is stationarily held on the retaining rail or the pivot arm 45.

With this state, in accordance with a content in the delivery member distribution table 78, the servo motor 47 for rotating the distribution arm 44 is rotated by a predetermined angular amount, and the rotary member 41 is rotated about its axis in a normal or reverse direction by way of the drive pulley 48, etc. Thus, the distribution arm 44 which holds the delivery member 36 is angularly moved to a position in confrontation with the outlet rail portion 10b or 11b in Step S190.

After the angular rotation of the distribution arm 44, the depression member 53 urges the pivot arm 45 upwardly by the actuation of the vertically extendible cylinder 51 associated with the distribution arm 44. Therefore, the pivot arm 45 has a horizontally extending posture to elevate the delivery member 36, so that the engagement wheel 38 is brought into engagement with the first or second endless chain 20 or 23. Then, in accordance with the driving movement of the chain, the delivery member 36 is transferred from the distribution arm 44 to the outlet rail portion 10b or 11b in Step S200.

The processings in the Step S190 and S200 are executed twice with respect to every one of the distribution arms 44, so that all delivery members are transferred out of the distribution arms. In Step 210, judgment is made as to whether or not all the delivery members are discharged from the distribution arms. If the determination falls Yes, the routine returns back to the Step S100 for repeating the above described processings.

On the other hand, if troubled location has been stored in the RAM 66 of the electronic control circuit 60, in the Step S120, the determination falls that the there is any trouble. Then, the routine goes into Step 220 where judgment is made with reference to the destination command table 76 as to whether or not the destination is on the same transfer line. If the judgment falls Yes, the routine proceeds into Step S 230 where judgment is made with reference to the trouble information table 82 as to whether or not the troubled location is positioned on the way of the delivery member toward the destination. On the other hand, if no troubled location exists in the route of the delivery member, the delivery member can reach the destination in the same transfer line. Therefore, in the Step S140, angular rotation angle of the distribution arm and intended bridge rail numbers are computed and stored for setting the distribution command.

If the destination is on the same transfer line as a result of the judgment in the Step S220 but the troubled location exists on its way to the destination as a result of the judgment in the Step S230, the routine proceeds into Step S240. In the Step S240, referring to the line connection information table 80 shown in FIG. 12 and the trouble information table 82 in FIG. 15, judgment is made as to whether or not upstream and downstream distribution mechanism of the troubled location are connected to the other transfer line without any trouble. If the determination falls Yes, i.e., the upstream and downstream distribution mechanism with respect to the troubled location are connected to the other transfer line without any trouble, the routine goes into Step S245 where judgment is made as to whether or not the upstream distribution mechanism is connected to the other transfer line. If the upstream distribution mechanism is not connected to the other transfer line as a result of the judgment in the Step S245, similar to the processing in the Step S150, the routine goes into Step S250 where the distribution command is set in the upstream distribution mechanism so as to angularly rotate the distribution arm to the optimum bridge rail 10 in order to direct the delivery member 36 toward a distribution mechanism positioned immediately upstream of the troubled location. On the other hand, if the determination in the Step S245 falls Yes, i.e., the upstream distribution mechanism is connected to the other transfer line, the routine goes into the Step S160.

For example, assuming that the troubled location exists between the distribution mechanisms 1d and 1e("1d-1e" is stored in the trouble information table 82) and if the delivery member 36 whose destination is imparted with the work station ST8 is transferred in the distribution mechanism 1b of the first transfer line 1. In this case, the work station ST8 is also on the first transfer line 1, but the troubled location exists in the first transfer line 1. Therefore, the routine flows through the Steps S120, S220, S230 and S240. In the Step S240, since the distribution mechanisms 1c and 2c are interconnected with each other (upstream distribution mechanism of the troubled location), and since the distribution mechanisms 1e and 2e are interconnected with each other (downstream distribution mechanism of the troubled location), the judgment in the Step S240 falls Yes. On the other hand, since the distribution mechanism 1b is not interconnected with the other transfer line, the judgment in the Step S245 falls No. Therefore, in the distribution mechanism 2b, computed and stored in the Step S250, are the rotation angle of the distribution arm and the destination rail number so as to transfer the delivery member 36 to the distribution mechanism 1c through the optimum bridge rail 10 in order to transfer the delivery member toward the distribution mechanism 1c immediately upstream of the troubled location. Then, in the distribution mechanism 1c, processings along the Steps S120, S220, S230, S240, S245 are executed and through the Step S245, the program proceeds to the Step S160 since the distribution mechanism 1c is connected to the other transfer line 2. In the Step S160, distribution command is set so as to direct the delivery member from the distribution mechanism 1c to 2c. Thereafter, in each of the distribution mechanisms 2c, 2d and 2e, distribution commands are set, respectively so as to finally direct the delivery member to the distribution mechanism 1e by way of the processings of S220, S270, S280 and S140 those being described later in detail.

In the Step S240, if the judgment falls No, i.e., if the upstream or downstream portion with respect to the troubled location is not connected to the other transfer line, the delivery member cannot reach the destination. Therefore, the routine goes into Step S260 in which a processing is executed so as to return back the delivery member 36 toward its starting point To this effect, in the Step S260, rotation angle of the distribution arm and the rail number are computed and stored to set a distribution command. Thus, if the delivery member cannot reach the destination due to existence of the troubled location, the delivery member is subjected to distribution command so that it returns back toward the original location Accordingly, the delivery member is circularly transferred for example between the distribution mechanisms 1a and 1b until the trouble is eliminated.

Figures 14, 15:
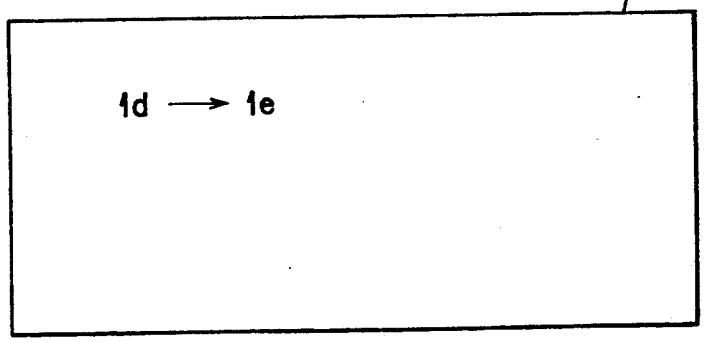
FIG. 14 is a view showing a table which contains information of distribution of delivery members according to one embodiment of this invention.
FIG. 15 is a view showing a table which contains impediment information of the transferring mechanism according to one embodiment of this invention.

If in the Step S220, if the judgment falls No, i.e., if the destination of the delivery member is on the other transfer line, the routine goes into Step S270 where judgment is made with reference to the line connection information table 80 shown in FIG. 12 and the trouble information table 82 in FIG. 15, as to whether or not troubled location exists in a route toward the destination and at a portion upstream of a first line connection between the first and the second transfer lines. If the determination falls No, i.e., no troubled portion exists before the first interconnection, the routine proceeds into Step S280 where judgment is made as to whether or not troubled portion exists at a route downstream of the first interconnecting portions and at the other transfer line. If the determination falls No, the routine proceeds into the Step S140 so as to control distribution command in order to direct the delivery member toward the destination through the modified route.

For example, if the troubled location exists between the distribution mechanisms 1d and 1e and if the delivery member 36 whose destination is toward the work station ST8 is now on the distribution mechanism 2c on the second transfer line 2, the processings of S220, S270, S280 and S140 are successively executed in the respective distribution mechanisms 2c, 2d and 2e, so that distribution commands are set so that the delivery member 36 on the distribution mechanism 2c in the second transfer line 2 can be transferred to the distribution mechanism 1e of the first transfer line 1.

Further, if there is no troubled location before the first interconnecting portion as a result of the judgment in the Step S270 and if troubled portion exists at the route downstream of the first interconnecting portions and at the other transfer line as a result of the judgment in the Step S280, the routine proceeds into Step S290 where judgment is made as to whether or not there is line connection between the two transfer lines at a portion downstream of the troubled location. If the determination falls Yes, the routine goes into Step S300 where distribution command is set so as to direct the delivery member toward a bridge rail 10 which can direct the delivery member toward the line connection downstream of the troubled location.

For example, if the troubled location exists between the distribution mechanisms 1d and 1e and if the delivery member 36 whose destination is toward the work station ST8 is now on the distribution mechanism 2b on the second transfer line 2, determination in the Step S270 falls No since there is no troubled portion at a portion upstream of the first interconnecting portion 1c and 2c. Further, the determination in the Step S280 falls Yes, since troubled location exists at the connection between 1d and 1e which are positioned downstream of the first interconnecting portions 1c and 2c and at the other transfer line (here, the second transfer line 2 is one transfer line and the first transfer line 1 is the other transfer line with respect to the distribution mechanism 2b). However, the judgment in the Step S290 falls Yes, since there is line connection 1e and 2e between the two transfer lines at a portion downstream of the troubled location 1d-1e. Therefore, in the Step S300 distribution command is set so as to direct the delivery member toward the line connection 2e-1e downstream of the troubled location 1d-1e.

if there is no troubled location before the first interconnecting portion as a result of the judgment in the Step S270 and if troubled portion exists at the route downstream of the first interconnecting portions and at the other transfer line as a result of the judgment in the Step S280 and if there is no interconnection at the portion downstream of the troubled location, the determination in the Step S290 falls No, and the routine goes into the Step S260 so as to return back the delivery member 36 toward its starting point since the delivery member cannot reach the destination due to the existence of the troubled location.

On the other hand, if in the transfer route directing toward the destination, any troubled portion exists at a portion upstream of the first interconnection line as a result of the judgment in the Step S270, the routine goes into Step S310 in which judgment is made as to whether or not there is any other line connection free from any trouble with reference to the line connection table 80. If the judgment in the Step S310 falls Yes, (no trouble exists), distribution command is set in Step 320 so that the delivery member can be directed to a bridge rail 10 which is directed to the line connection which is free from trouble.

For example, assuming that troubled location exists between the lines 1d-1e and desired sewing operation has been carried out at the work station ST6 connected to the distribution mechanism 1d on the transfer line 1. Further assuming that the delivery member just transferred from the work station ST6 into the distribution mechanism 1d is to be further transferred to the work station ST26. In this situation, it is impossible to directly transfer the delivery member from the distribution mechanism 1d to 1e as a result of the judgment executed in the Step S270. However, according to the judgment in the Step S310 there is a line connection 1c and 2c where no trouble occurs. Therefore, by the judgment in the subsequent Step S320, the delivery member can be directed toward the distribution mechanism 1c from 1d. Thereafter, in the distribution mechanism 1c, processings of S120, S270, S280 and S140 are successively executed, so that distribution command is set in order to direct the delivery member toward the distribution mechanism 2c. In the distribution mechanism 2c, processing of S120, S220, S230, and S140 are successively executed, so that the delivery member can be directed toward the distribution mechanism 2d. The same is true with respect to the processings in the distribution mechanisms 2d. Thus, the delivery member 36 can reach the distribution mechanism 2e for its transfer to the work station ST26.

Further, assuming that the Step S220, if the judgment falls No, i.e., the delivery member is to be transferred to the other line and the troubled location is provided at a portion upstream of the first interconnection to the other line, the judgment in the Step S270 falls Yes, so that the routine proceeds into the Step S310. In this case, if there is no line connection free from any trouble, the judgment in the Step S310 falls No, and the routine goes to the Step S260 where distribution command is set for returning the delivery member to the starting point.

Thus, in accordance with the setting of the distribution command as a result of processings executed through the Steps S140, S160, S250, S260, S300 and S320, the delivery member 36 can be distributed onto the bridge rail 10 or the station rail 11 in response to the distribution command because of the processings through the Steps S170, S180, S190, S200 and S210 in order to transfer the delivery member 36. Incidentally, when the delivery member 36 on the station rail 11 is brought to a position in confrontation with the work station ST, the movement of the delivery member 36 is stopped by the abutment with a stop member protrudable on the station rail 11. With this state, workers or operators take out the workpiece from the delivery member 36 for effecting intended sewing etc. Upon completion of the desired work, the workers again set the workpiece on the delivery member 36, and then, the stop member is retracted for again transferring the delivery member 36.

Figure 1:
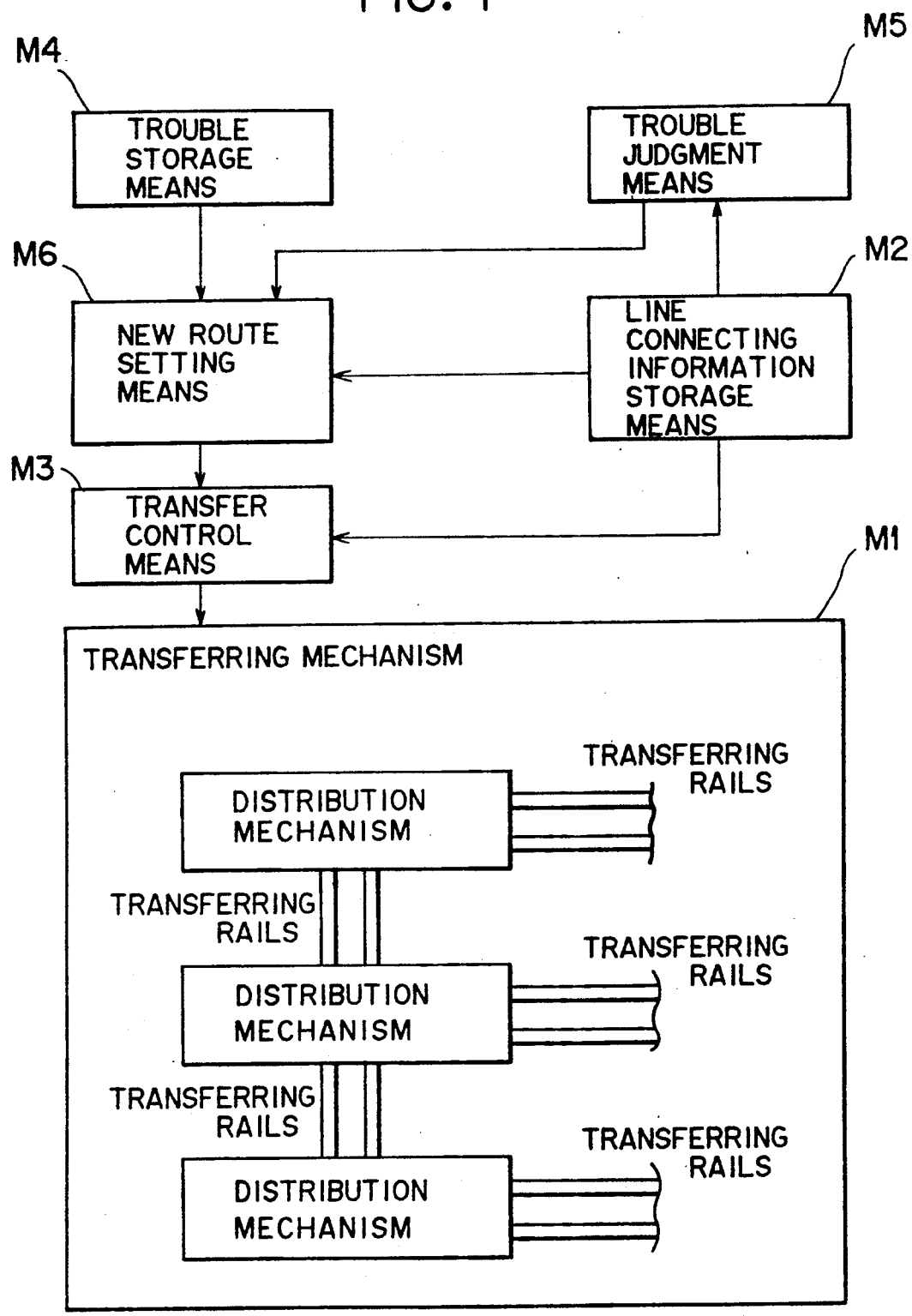
FIG. 1 is a block diagram showing a fundamental arrangement of a transferring system according to the present invention.

The overall arrangement of the transferring system according to the above described embodiment will be summarized below with reference to FIG. 1 in connection with the transferring mechanism. In FIG. 1, the transferring mechanism is designated by a character M1. in the transferring mechanism M1 a plurality of the distribution mechanisms are connected to one another by a plurality of transferring rails on which the delivery members can be transferred. By the operation of the distribution mechanism. the delivery member can be distributed to the selected one of the transferring rails so as to direct the delivery member to its destination.

The transferring system also includes line connecting information storage means M2 in which stored is the connection or disconnection between the neighboring distribution mechanisms. The system further includes a transfer control means M3 which controls the transferring mechanism M1 for distributing the delivery member to a proper transferring rails which is capable of directing the delivery member to its destination in accordance with a predetermined transferring rule on a basis of the line connecting information.

These arrangement are the same as those of the conventional transferring system. The transferring system according to the present invention is further provided with trouble storage means M4, trouble judgment means M5 and new route setting means M6 in troubled situation. That is, the trouble storage means M4 is adapted for storing the troubled location in the transferring mechanism M1 which trouble prevents the delivery member from being further transferred. The trouble judgment means M5 judges whether or not there is any troubled location on a route of the delivery member directing toward its destination, the route being in accordance with the predetermined transferring rule on the basis of the line connecting information. The new route setting means M6 is operated in case the troubled location exists. That is, if the troubled location exists, different transferring rails are selected for directing the delivery member to its destination while obviating a pathway of the troubled location on the basis of the line connecting information disregarding the predetermined transferring rule. Therefore, by the new route setting means, The new transferring command is provided by the new route setting means M6, and the command is input to the transfer control means M3 so as to direct the delivery member to the different transferring rails which were not selected in the predetermined transferring rule. Thus, the delivery member can safely reach the destination by obviating the troubled location.

The line connecting information storage means M2 stores therein data of interconnection between the distribution mechanisms by the transferring rails, and the trouble storage means M4 stores therein data of troubled location in the transferring mechanism. The trouble judgment means M5 judges whether or not there is any trouble on a way of the delivery member toward the destination, the route being defined by the predetermined transferring rule on the basis of the line connecting information. If trouble exists, the new route setting means will setup a new route in which the delivery member is distributed to the other transferring rail which is not directed to the troubled location in order to transfer the delivery member to its destination through the route other than a route defined by the transferring rule based on the line connecting information and without regard to the transferring rule.

In this connection, the RAM 66 within the electronic control circuit 60 serves as the line connecting information storage means M2 and the trouble storage means M4. The processings executed in the Steps S180 through S210 serve as the transfer control means M3. Further, the processings executed in the Steps S120, S220, S230 and S270 through S290 serve as the trouble judgment means M5, and the processings executed in the Steps S240 through S260 and S300 through S320 serve as the new route setting means M6.

As described above, according to the present invention, on the basis of the line connecting information, if the troubled location is provided on the way of the delivery member toward its destination along the travel route given by the predetermined transferring rule, the trouble judgment means judges that there is the trouble which prevents the delivery member from being transferred. Thus, the delivery member is distributed to the different bridge rail 10 which is not directed to the delivery member toward the troubled location with disregarding the transferring rule.

Accordingly, even if any trouble such as overflowing is provided on the traveling route given by the predetermined transfer rule, the delivery member can arrive at its destination with obviating the troubled location. Therefore, entire working efficiency can be improved. Consequently, even if each one of the distribution mechanisms in one transfer line is not connected to respective one of the distribution mechanisms of the other transfer line, the delivery member can reach to its destination or intended work station ST with a minimum numbers of the line connections. As a result, numbers of the work stations can be increased, even if numbers of the distribution mechanisms are not changed or increased. Apparently, as described above, each of the distribution mechanisms is subjected to complexed control and has complexed construction. In this connection, in the present invention, it is unnecessary to increase the numbers of the distribution mechanism in order to allow the delivery member to reach it destination. Therefore, simplified entire construction results.

While the invention has been described in detail and with reference to specific embodiment thereof, it would be apparent to those skilled in the art that various changes and modifications may be made therein without departing from the spirit and scope of the invention. For example, in the above described embodiment, eight distribution arms 44 are radially provided at equi angular relationship by every 45 degrees. However, numbers of the distribution arms 44 can be increased to ten, so that the arms are equi angularly arranged by every 36 degrees.

WHAT IS CLAIMED IS:

1. A transferring system for transferring delivery members to destinations, the system comprising:
   a transferring mechanism (M1) comprising a plurality of distribution mechanisms (1a through 2e), and a plurality of transferring rails (10) for connecting neighboring distribution mechanisms with one another, each of the delivery members (36) being transferred on the transferring rails and being distributed to a selected one of the transferring rails so as to direct the delivery member to its destination;
   a line connecting information storage means (M2, 60,66) for storing line connecting information between the neighboring distribution mechanisms;
   a transfer control means (M3, S180 to S210) for controlling the transferring mechanism thereby distributing the delivery members to proper transferring rails which are capable of directing the delivery members to their destinations in accordance with a predetermined transferring rule on a basis of the line connecting information;
   trouble storage means (M4,60,66) for storing a troubled location in the transferring mechanism which troubled location prevents at least one of the delivery members from being further transferred;
   trouble judgment means (M5,S120,S220, S230,S270,S280, S290) for judging whether or not there is any troubled location on a transfer route of said at least one of the delivery members directing toward its destination, the transfer route being established in accordance with the predetermined transferring rule on the basis of the line connecting information; and
   new route setting means (M6,S240,S250,S260, S300,S310 S320) for providing another route to permit said at least one of the delivery members to be directed to its destination when the troubled location exists in the transfer route.

2. The transferring system as claimed in claim 1, wherein the transfer control means (M3) is connected to the line connecting information storage means (M2) for executing the transferring rule on a basis of the line connecting information.

3. The transferring system as claimed in claim 1, wherein the trouble judgement means is connected to the line connecting information storage means for judging whether or not the troubled location exists on the transfer route of said at least one of the delivery members.

4. The transferring system as claimed in claim 1, wherein the new route setting means is connected to the line connecting information storage means (M2), the trouble storage means (M4) and the trouble judgment means (M5).

5. The transferring system as claimed in claim 4, wherein the new route setting means comprises a transfer command setting means which produces a transferring command for selecting another transferring rail in order to direct said at least one of the delivery members to its destination while obviating the troubled location on a basis of the line connecting information and disregarding the predetermined transferring rule, the transferring command being input to the transfer control means (M3) so as to direct said at least one of the delivery members to the another transferring rail which was non-selected in the predetermined transferring rule.

6. The transferring system as claimed in claim 5, wherein each of the distribution mechanisms comprises
   a drive member (47);
   a rotary member (41) connected to the drive member for rotating the rotary member about an axis; and
   a plurality of distribution arms (44) radially extending from the rotary member at equi-angular relationship, a selected one of the distribution arms being alignable with one of the transferring rails (10) upon angular rotation of the rotary member by the drive member, the delivery members being transferable onto and dischargeable from the distribution arms.

7. The transferring system as claimed in claim 6, wherein the transfer control means is connected to the drive member for controlling angular rotational amount of the distribution arms on which the delivery members to be transferred are positioned and for aligning one of the distribution arms to the another transferring rail in accordance with the transferring command.

* * * * *